United States Patent
Wardak

(10) Patent No.: US 11,055,982 B1
(45) Date of Patent: Jul. 6, 2021

(54) HEALTH CONDITION MONITORING DEVICE

(71) Applicant: Masouda Wardak, Toms River, NJ (US)

(72) Inventor: Masouda Wardak, Toms River, NJ (US)

( * ) Notice: Subject to any disclaimer, the term of this patent is extended or adjusted under 35 U.S.C. 154(b) by 0 days.

(21) Appl. No.: 16/812,855

(22) Filed: Mar. 9, 2020

(51) Int. Cl.
*G08B 1/08* (2006.01)
*G08B 25/01* (2006.01)
*G06K 9/46* (2006.01)
*G08B 21/24* (2006.01)

(52) U.S. Cl.
CPC ............. *G08B 25/016* (2013.01); *G06K 9/46* (2013.01); *G08B 21/24* (2013.01); *G06K 2209/01* (2013.01)

(58) Field of Classification Search
CPC ........ G08B 25/016; G08B 21/24; G06K 9/46; G06K 2209/01
USPC ...................................................... 340/539.12
See application file for complete search history.

(56) References Cited

U.S. PATENT DOCUMENTS

| | | | | |
|---|---|---|---|---|
| 5,818,733 A * | 10/1998 | Hyuga | ................... | H04N 7/181 702/188 |
| 6,075,755 A * | 6/2000 | Zarchan | ................ | A61J 7/0481 368/10 |
| 7,605,714 B2 * | 10/2009 | Thompson | ............. | G08C 17/02 340/10.1 |
| 9,191,482 B1 * | 11/2015 | Sidbury | ................... | H04M 1/22 |
| 9,826,907 B2 * | 11/2017 | Magi | ....................... | A61B 5/441 |
| 2002/0188472 A1 * | 12/2002 | Fujisaka | ................ | G06Q 50/22 705/2 |
| 2007/0159321 A1 * | 7/2007 | Ogata | ..................... | A61B 5/681 340/539.12 |
| 2008/0024265 A1 * | 1/2008 | Jones | .................... | G01R 29/085 338/252 |
| 2008/0208009 A1 * | 8/2008 | Shklarski | ............... | A61B 5/681 600/301 |
| 2008/0294058 A1 * | 11/2008 | Shklarski | ........... | A61B 5/02055 600/502 |
| 2009/0280861 A1 * | 11/2009 | Khan | ................... | H04B 1/3827 455/556.1 |
| 2009/0322513 A1 * | 12/2009 | Hwang | ................ | G08B 25/016 340/539.12 |
| 2010/0255890 A1 * | 10/2010 | Mikkelsen | ........ | H04M 1/72527 455/567 |
| 2011/0224505 A1 * | 9/2011 | Sadhu | .................. | A61B 5/7465 600/301 |
| 2012/0062432 A1 * | 3/2012 | Wu | ........................ | G01S 5/0252 343/720 |
| 2012/0215552 A1 * | 8/2012 | Goldschmidt | ......... | G06Q 10/10 705/2 |
| 2013/0021154 A1 * | 1/2013 | Solomon | ............ | A61B 5/02055 340/539.12 |

(Continued)

*Primary Examiner* — Kerri L McNally
*Assistant Examiner* — Thang D Tran
(74) *Attorney, Agent, or Firm* — The Iwashko Law Firm, PLLC; Lev Ivan Gabriel Iwashko

(57) ABSTRACT

A health condition monitoring device, including a band that is wearable by a user, a monitor control unit disposed on at least a portion of the band to provide health related information to the user, and a fastener assembly disposed on at least a portion of a first end of the band and at least a portion of a second end of the band to connect the first end to the second end.

9 Claims, 3 Drawing Sheets

(56) References Cited

U.S. PATENT DOCUMENTS

| | | | |
|---|---|---|---|
| 2013/0150686 A1* | 6/2013 | Fronterhouse | A61B 5/1117 600/323 |
| 2013/0163794 A1* | 6/2013 | Groves | G06F 1/1626 381/303 |
| 2014/0044286 A1* | 2/2014 | Coles | H04R 1/028 381/150 |
| 2014/0085082 A1* | 3/2014 | Lyon | A61B 5/0002 340/539.12 |
| 2014/0239065 A1* | 8/2014 | Zhou | G06F 1/163 235/380 |
| 2015/0137731 A1* | 5/2015 | Kim | A45F 5/00 320/101 |
| 2015/0182128 A1* | 7/2015 | Magi | A61B 5/0002 340/539.12 |
| 2015/0241917 A1* | 8/2015 | Seok | A61B 5/681 361/679.03 |
| 2015/0269825 A1* | 9/2015 | Tran | A61B 5/7225 340/539.12 |
| 2015/0348389 A1* | 12/2015 | Jang | H04M 1/72421 455/404.1 |
| 2015/0378391 A1* | 12/2015 | Huitema | G09F 9/301 361/679.03 |
| 2016/0317060 A1* | 11/2016 | Connor | A61B 5/681 |
| 2017/0236390 A1* | 8/2017 | Herschkowitz | G08B 21/0288 340/539.12 |
| 2017/0243479 A1* | 8/2017 | Hill | H04N 7/185 |
| 2017/0293740 A1* | 10/2017 | Xing | G06Q 30/0226 |
| 2017/0365766 A1* | 12/2017 | Boukai | G04G 17/04 |
| 2018/0070840 A1* | 3/2018 | Cronin | A61B 5/6824 |
| 2018/0218124 A1* | 8/2018 | Gorelick | G16H 10/65 |
| 2018/0342329 A1* | 11/2018 | Rufo | H04L 12/2812 |
| 2018/0348880 A1* | 12/2018 | Juliato | A61B 5/4519 |
| 2018/0357887 A1* | 12/2018 | Geyer | G08B 25/016 |
| 2019/0034832 A1* | 1/2019 | Reimer | H04W 4/023 |
| 2019/0110744 A1* | 4/2019 | Zhu | A61B 5/02055 |
| 2019/0121522 A1* | 4/2019 | Davis | G06F 3/04815 |
| 2019/0197864 A1* | 6/2019 | Hui | G08B 21/0269 |
| 2019/0206538 A1* | 7/2019 | Xing | A61B 5/4848 |
| 2019/0278310 A1* | 9/2019 | Lalanne | G05D 23/1917 |
| 2019/0350457 A1* | 11/2019 | Avitan | G16H 40/67 |
| 2020/0077892 A1* | 3/2020 | Tran | A61B 5/6824 |

* cited by examiner

HEALTH CONDITION MONITORING DEVICE

BACKGROUND

1. Field

The present general inventive concept relates generally to a monitoring device, and particularly, to a health condition monitoring device.

2. Description of the Related Art

Ensuring the health and safety of elderly and/or handicapped people is a major concern in most modern societies. However, many of the elderly and/or handicapped people are often alone and their safety cannot be directly monitored by a caregiver. This lack of consistent health management often results in harm and/or death of the elderly and/or handicapped person.

For example, an elderly and/or handicapped person is highly susceptible to a fall, forgetting medication, and/or missing a doctor appointment. The problem can be compounded by a lack of a schedule and/or a lack of a reminder that the elderly and/or handicapped person fails to write down.

Therefore, there is a need for monitoring device that monitors a health condition of the elderly and/or handicapped person, and furthermore provides reminders of important events.

SUMMARY

The present general inventive concept provides a health condition monitoring device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a health condition monitoring device, including a band that is wearable by a user, a monitor control unit disposed on at least a portion of the band to provide health related information to the user, and a fastener assembly disposed on at least a portion of a first end of the band and at least a portion of a second end of the band to connect the first end to the second end.

The band may be waterproof.

The monitor control unit may include a display unit disposed on an entire surface of the monitor control unit to display the health related information to the user, a camera disposed on at least a portion of the display unit to record at least one of an image, a photograph, and a video of an environment of the user, an audio unit disposed on at least a portion of the display unit, a plurality of sensors disposed within at least a portion of the display unit to detect at least one of a change of position of the plurality of sensors, a luminosity level surrounding the plurality of sensors, and a temperature level of the user, and a plurality of buttons disposed on a first side and a second side of the display unit.

The plurality of buttons may include a medication reminder button disposed on the first side of the display unit to perform at least one of display a medication reminder on the display unit and emit an audio medication reminder on the audio unit in response to depressing the medication reminder button, an appointment reminder button disposed on the first side of the display unit to perform at least one of display an appointment reminder on the display unit and emit an audio appointment reminder on the audio unit in response to depressing the appointment reminder button, and a help button disposed on the first side of the display unit to send an emergency signal to an external device of a third party, such that the external device is alerted that the user is experiencing an emergency.

The audio medication reminder and the audio appointment reminder are configured to sound like a family member.

The plurality of buttons may further include an alert button disposed on the second side of the display unit to perform at least one of illuminating the display unit and emitting an alarm sound from the audio unit in response to depressing the alert button.

The monitor control unit may further include a GPS unit disposed within at least a portion of the display unit to track a location of the user.

The health condition monitoring device may further include an OCR unit disposed within at least a portion of the monitor control unit to convert at least one of a letter, a word, and a phrase captured from the camera into the letter, the word, and the phrase, respectively, for a message.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
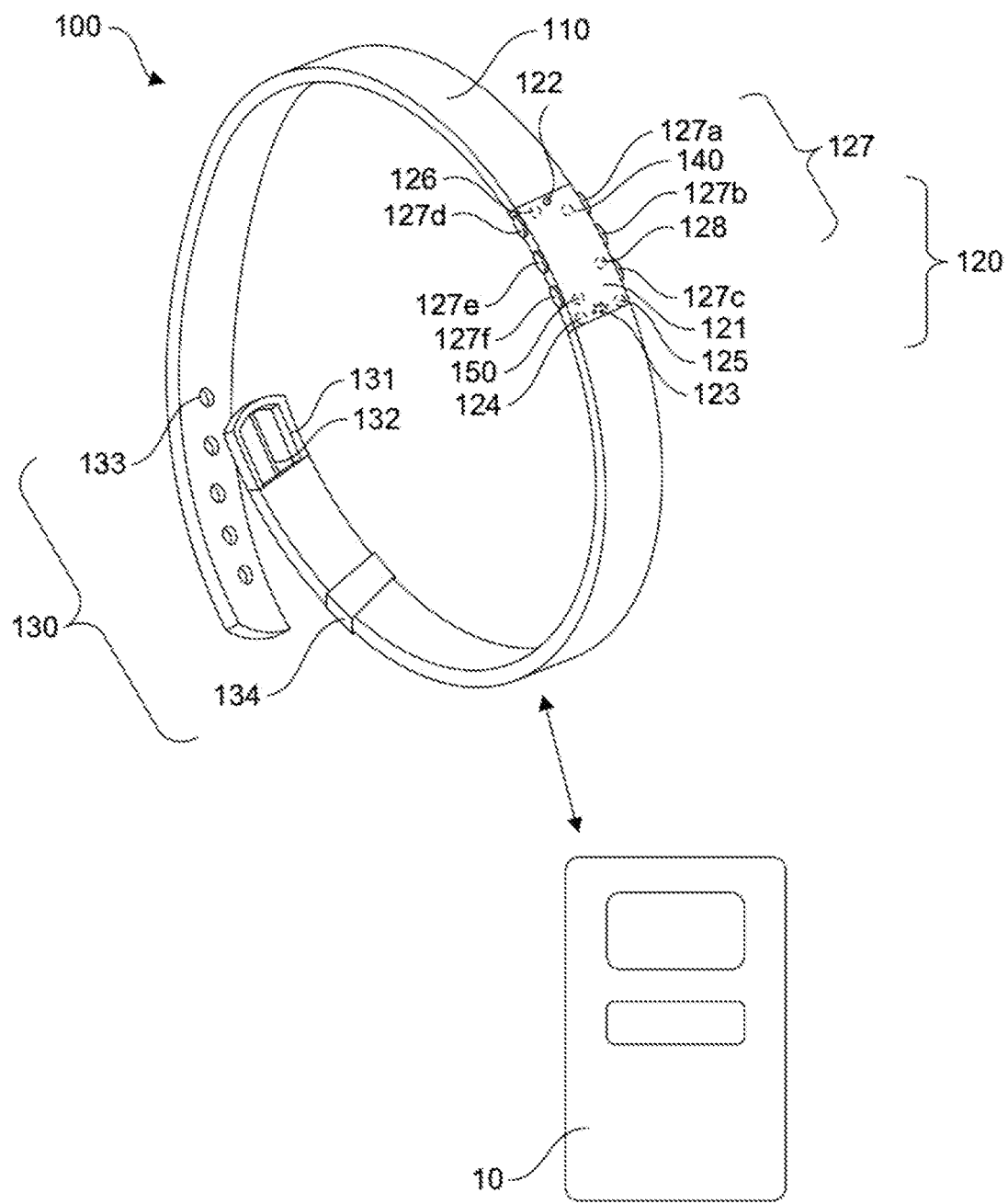
FIG. 1A illustrates an isometric view of a health condition monitoring device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Health Condition Monitoring Device 100
Band 110
Monitor Control Unit 120
Display Unit 121
Camera 122
Audio Unit 123
Global Positioning System (GPS) 124
Communication Unit 125
Sensors 126
Buttons 127
Medication Reminder Button 127a
Appointment Reminder Button 127b
Help Button 127c
Alert Button 127d
Messaging Button 127e
Auxiliary Button 127f
Fastener Assembly 130
Band Receiving Member 131
Pin 132
Pin Receiving Apertures 133
Band Connecting Member 134
Optical Character Recognition (OCR) Unit 140
Power Source 150

FIG. 1A illustrates an isometric view of a health condition monitoring device 100, according to an exemplary embodiment of the present general inventive concept.

Figure 1B:
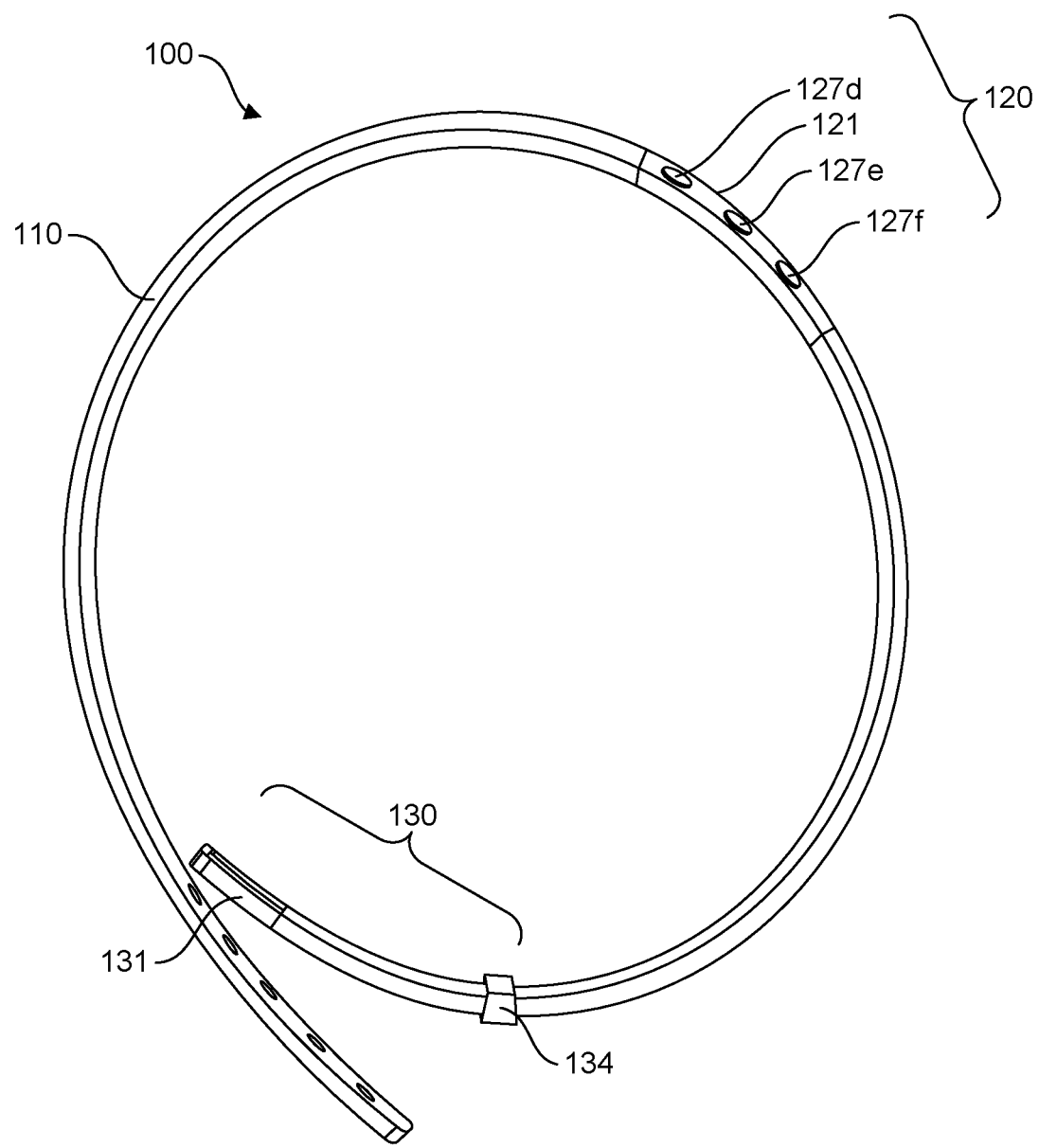
FIG. 1B illustrates a side view of the health condition monitoring device, according to an exemplary embodiment of the present general inventive concept.

FIG. 1B illustrates a side view of the health condition monitoring device 100, according to an exemplary embodiment of the present general inventive concept.

The health condition monitoring device 100 may be constructed from at least one of metal, plastic, and rubber, etc., but is not limited thereto. Additionally, the health condition monitoring device 100 may be waterproof, such that the health condition monitoring device 100 may be in contact with and/or submerged under water without damage thereto.

The health monitoring device 100 may include a band 110, a monitor control unit 120, a fastener assembly 130, an optical character recognition (OCR) unit 140, and a power source 150, but is not limited thereto.

The band 110 may be flexible to be worn around a neck, an arm, a wrist, a head, an ear, a finger, a leg, and/or a foot of a user. As such, the band 110 may have a predetermined length based on a preference of the user. For example, the predetermined length of the band 110 for the leg of the user may be greater than the predetermined length of the band 110 for the wrist of the user. Furthermore, the band 110 may be a necklace, an earring, and/or a patch.

Figure 2:
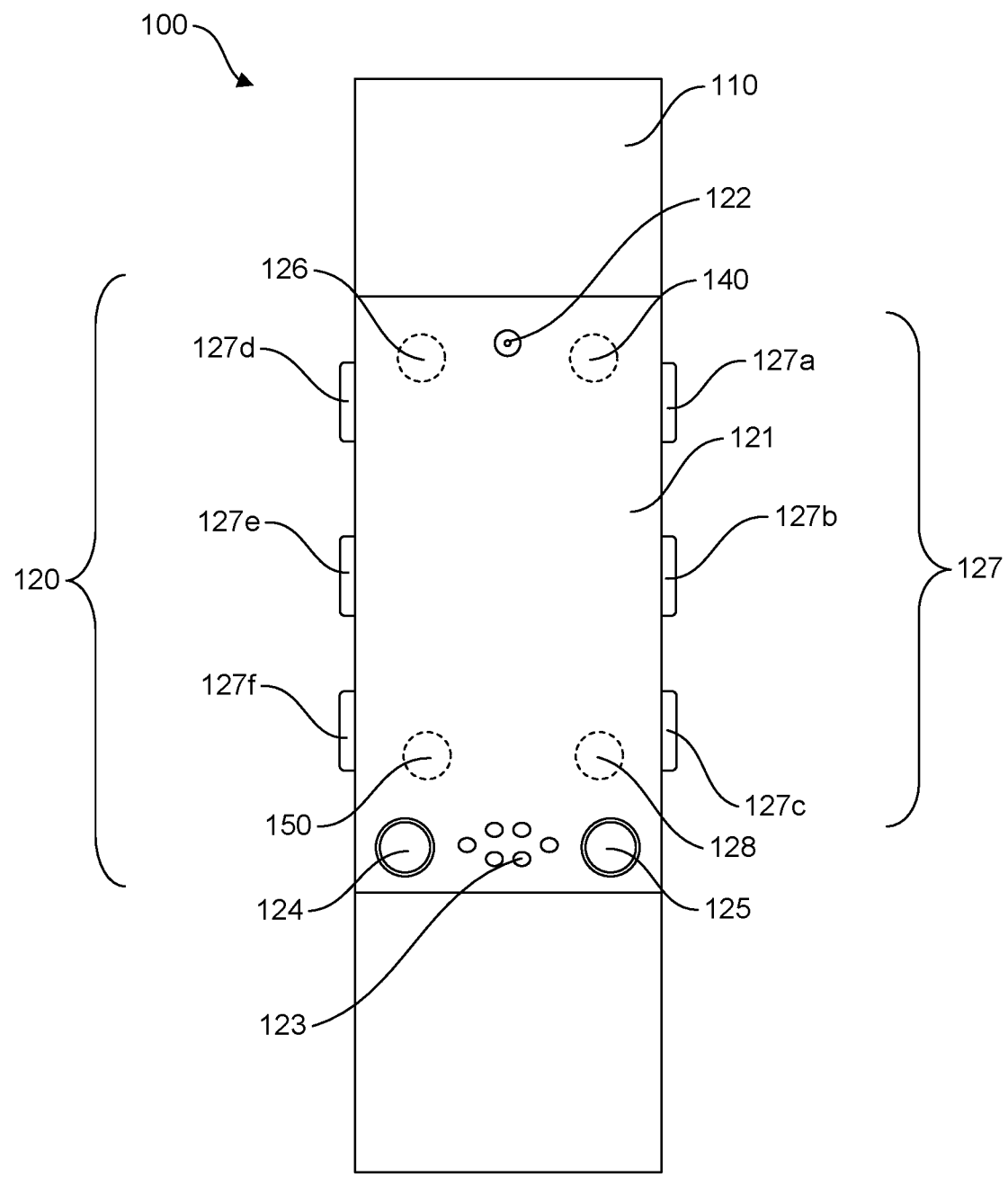
FIG. 2 illustrates a zoomed-in view of a monitor control unit as disposed on the health condition monitoring device, according to an exemplary embodiment of the present general inventive concept.

FIG. 2 illustrates a zoomed-in view of a monitor control unit 120 as disposed on the health condition monitoring device 100, according to an exemplary embodiment of the present general inventive concept.

The monitor control unit 120 may include a display unit 121, a camera 122, an audio unit 123, a global positioning system (GPS) 124, a communication unit 125, a plurality of sensors 126, a plurality of buttons 127, and a storage unit 128, but is not limited thereto.

The monitor control unit 120 may be disposed on at least a portion of the band 110 to provide health related information to the user. The health related information may include at least one of monitoring a health condition of the user, notifying a third party of the health condition of the user, and reminding the user of a health event. For example, the health condition of the user may include standing, falling, and/or receiving an injury. Additionally, the notifying the third party of the health condition of the user may refer to calling and/or messaging. Finally, reminding the user of the health event may refer to a reminder alert of a doctor appointment and/or a time to use medication.

The display unit 121 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 121 may be combined with the plurality of buttons 127 to be a touch-screen.

The display unit 121 may be disposed on a top surface, a first side surface, a second side surface, and a rear surface of the monitor control unit 120. In other words, the display unit 121 may be disposed on an entirety of the monitor control unit 120, such that at least a portion of the display unit 121 may be viewed at a variety of angles.

The camera 122 may include a photo camera and a video camera, but is not limited thereto.

The camera 122 may record an image, a photograph, and/or a video of an environment of the user, such that the camera 122 may indicate a location of the user.

The audio unit 123 may include a speaker and a microphone, but is not limited thereto.

The audio unit 123 may receive at least one voice command from the user to control the monitor control unit 120. In other words, the audio unit 123 may provide input to the monitor control unit 120 via the at least one voice command.

The GPS unit 124 may track a location of the monitor control unit 120. As such, the GPS unit 124 may track a location of the user while the user has the health condition monitoring device 100 (i.e. wearing, holding, etc.).

The communication unit 125 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The communication unit 125 may communicate with an external device 10 of a third party. The third party may include a family member, an emergency response member (e.g., police, fire, emergency medical team), and a doctor, but is not limited thereto.

Alternatively, the communication unit 125 may connect to a television (TV) (not illustrated) to display information from the display unit 121 onto the TV.

The plurality of sensors 126 may include a position sensor, a light sensor, a fever sensor, and a low battery sensor, but is not limited thereto.

The plurality of sensors 126 may detect a user has stumbled, tripped, and/or fallen based on the position sensor detecting a speed of change in height of the position sensor, as disposed on the user. Moreover, the plurality of sensors 126 may send an alert signal via the communication unit 125 to the external device 10 that the user has fallen and may be injured and/or unconscious. In other words, the position sensor of the plurality of sensors 126 may be configured to detect a predetermined range of values indicating the speed of change in height of the user is likely a result of a fall.

Also, the plurality of sensors 126 may detect a low light condition based on the light sensor detecting a change in a luminosity level surrounding the light sensor. Additionally, the display unit 121 may illuminate in response to the luminosity level falling below a predetermined luminosity level. In other words, the light sensor of the plurality of sensors 126 may be configured to detect the predetermined luminosity level indicating the luminosity level around the user is likely low and inadequate for the user to see clearly.

The plurality of sensors 126 may detect a fever of the user based on the fever sensor detecting a change in a temperature level of the user. Additionally, the display unit 121 may illuminate in response to the temperature level exceeding a predetermined temperature level. In other words, the fever sensor of the plurality of sensors 126 may be configured to detect the predetermined temperature level indicating the temperature level of the user is likely a result of a fever.

The plurality of buttons 127 may include a medication reminder button 127*a*, an appointment reminder button 127*b*, a help button 127*c*, an alert button 127*d*, a messaging button 127*e*, and an auxiliary button 127*f*, but is not limited thereto.

The storage unit 128 may include a random access memory (RAM), a read-only memory (ROM), a hard disk, a flash drive, a database connected to the Internet, cloud-based storage, Internet-based storage, or any other type of storage unit.

The medication reminder button 127*a* may be depressed to notify the user via a message displayed on the display unit 121 and/or an audible message via the audio unit 123. Furthermore, the speaker of the audio unit 123 may be programmed using the display unit 121, the audio unit 123 via the microphone, and/or the auxiliary button 127*f* to have a voice emulating the third party. Also, the display unit 121 and/or the audio unit 123 may have alternative language settings, such that different languages may be used. In other words, the audio unit 123 may emit an audio reminder for medication of the user in response to depressing the medication reminder button 127*a*, such that the audio reminder sounds like the family member and/or the doctor.

Also, the medication reminder button 127*a* may be depressed to store a medication reminder on the storage unit 128. Alternatively, subsequent to a doctor appointment, the doctor may use the external device 10 to upload the medication reminder via the communication unit 125 to the storage unit 128.

The appointment reminder button 127*b* may be depressed to notify the user via another message displayed on the display unit 121 and/or another audible message via the audio unit 123. As discussed above with respect to the medication reminder button 127*a*, the audio unit 123 may emit another audio reminder for the doctor appointment of the user in response to depressing the appointment reminder button 127*b*, such that the audio reminder sounds like the family member and/or the doctor.

Also, the appointment reminder button 127*b* may be depressed to store an appointment reminder on the storage unit 128. Alternatively, subsequent to the doctor appointment, the doctor may use the external device 10 to upload the appointment reminder via the communication unit 125 to the storage unit 128.

Furthermore, the storage unit 128 may receive medical profile from the external device 10 of the third party including an identification of the user, health insurance for the user, contact information for the third party, allergy information, and a medication list. The display unit 121 may display a barcode that stores all of the medical profile information stored on the storage unit 128.

The help button 127*c* may be depressed to send an emergency signal to the external device 10 of the third party, such that the external device 10 may be alerted that the user is experiencing an emergency, such as a fall and/or a lack of medication.

The alert button 127*d* may be depressed to send an immediate alert signal to the display unit 121 and/or the audio unit 123. More specifically, the display unit 121 may illuminate in response to the alert button 127*d* being depressed, such that the display unit 121 may display a variety of colors and/or flash the display unit 121 to indicate the emergency. Similarly, the audio unit 123 may emit an alarm sound to indicate the emergency. As such, the alert button 127*d* may be depressed to notify a surrounding area of the user of the emergency.

The messaging button 127*e* may be depressed to send a message to the external device 10 of the third party. Moreover, the message may be a predetermined set of fixed messages, such as "Help," "I have fallen," and/or "I need my medicine." Alternatively, the message may be typed by the user via the display unit 121 and/or created via the microphone of the audio unit 123. Also, the message may be limited to one-hundred and thirty words, but is not limited thereto. As such, the messaging button 127*e* may notify the external device 10 of a less serious emergency event.

The camera 122 and/or the GPS 124 may be configured to send pictures and/or the location of the user, respectively, to the external device 10 of the third party, such that the third party may view the surrounding area of the user and locate the user to quickly assist the user.

The auxiliary button 127*f* may be depressed to perform voice recording functions to the audio unit 123.

The fastener assembly 130 may include a band receiving member 131, a pin 132, a plurality of pin receiving apertures 133, and a band connecting member 134, but is not limited thereto.

The band receiving member 131 may be disposed on at least a portion of a first end of the band 110. The pin 132 may be transversely disposed within at least a portion of the band receiving member 131. Moreover, the pin 132 may pivot within the band receiving member 131. The plurality of pin receiving apertures 133 may be disposed on at least a portion of a second end of the band 110.

As such, the second end of the band 110 may be inserted through band receiving member 131, such that the pin 132 may be inserted into at least one of the plurality of pin receiving apertures 133. Also, the pin 132 may pivot to facilitate movement of the second end of the band 110 through the band receiving member 131. Accordingly, the band connecting member 134 may be slidably disposed over at least a portion of the first end of the band 110, such that the band connecting member 134 may be moved over the second end of the band 110 to prevent the second end of the band 110 from moving away from the first end of the band 110. Furthermore, the pin 132 may connect the second end of the band 110 to the first end of the band 110.

The OCR unit 140 may be disposed within at least a portion of the monitor control unit 120. The OCR unit 140 may receive a letter, a word, and/or a phrase via the camera 122. The OCR unit 140 may convert the letter, the word, and/or the phrase captured from the camera into the letter, the word, and/or the phrase on the display unit 121 and/or the audio unit 123, such that the letter, the word, and/or the phrase is entered directly into the message. For example, the auxiliary button 127f may be depressed for a predetermined duration of time and/or a predetermined number of times to activate the OCR unit 140. As such, the OCR unit 140 may facilitate entry of messaging for the user, when the user is unable to use the display unit 121 and/or the audio unit 123.

The power source 150 may include a battery and a solar cell, but is not limited thereto. The battery may include lithium-ion, nickel cadmium, nickel metal hydride, alkaline, etc., but is not limited thereto.

The power source 150 may be disposed within at least a portion of the monitor control unit 120. The power source 150 may provide power to the monitor control unit 120 and the OCR unit 140, but is not limited thereto.

The low battery sensor of the plurality of sensors 126 may detect when the power source 150 is low on power. As such, the low battery sensor of the plurality of sensors 126 may send a low battery signal to the external device 10 of the third party, such that the health condition monitoring device 100 may be at risk of losing power. As such, the third party may assist and/or notify the user to replace and/or repair the power source 150.

Therefore, the health condition monitoring device 100 may help the user notify the third party in event of a fall, forgetting medication, and/or forgetting an appointment. Also, the health condition monitoring device 100 may maintain reminders without the user having to create a reminder.

The present general inventive concept may include a health condition monitoring device 100, including a band 110 that is wearable by a user, a monitor control unit 120 disposed on at least a portion of the band 110 to provide health related information to the user, and a fastener assembly 130 disposed on at least a portion of a first end of the band 110 and at least a portion of a second end of the band 110 to connect the first end to the second end.

The band 110 may be waterproof.

The monitor control unit 120 may include a display unit 121 disposed on an entire surface of the monitor control unit 120 to display the health related information to the user, a camera 122 disposed on at least a portion of the display unit 121 to record at least one of an image, a photograph, and a video of an environment of the user, an audio unit 123 disposed on at least a portion of the display unit 121, a plurality of sensors 126 disposed within at least a portion of the display unit 121 to detect at least one of a change of position of the plurality of sensors 126, a luminosity level surrounding the plurality of sensors 126, and a temperature level of the user, and a plurality of buttons 127 disposed on a first side and a second side of the display unit 121.

The plurality of buttons 127 may include a medication reminder button 127a disposed on the first side of the display unit 121 to perform at least one of display a medication reminder on the display unit 121 and emit an audio medication reminder on the audio unit 123 in response to depressing the medication reminder button 127a, an appointment reminder button 127b disposed on the first side of the display unit 121 to perform at least one of display an appointment reminder on the display unit 121 and emit an audio appointment reminder on the audio unit 123 in response to depressing the appointment reminder button 127b, and a help button 127c disposed on the first side of the display unit 121 to send an emergency signal to an external device 10 of a third party, such that the external device 10 is alerted that the user is experiencing an emergency.

The audio medication reminder and the audio appointment reminder are configured to sound like a family member.

The plurality of buttons 127 may further include an alert button 127d disposed on the second side of the display unit 121 to perform at least one of illuminating the display unit 121 and emitting an alarm sound from the audio unit 123 in response to depressing the alert button 127d.

The monitor control unit 120 may further include a GPS unit 124 disposed within at least a portion of the display unit 121 to track a location of the user.

The health condition monitoring device 100 may further include an OCR unit 140 disposed within at least a portion of the monitor control unit 120 to convert at least one of a letter, a word, and a phrase captured from the camera 122 into the letter, the word, and the phrase, respectively, for a message.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A health condition monitoring device, comprising:
  a band that is wearable by a user;
  a monitor control unit disposed on at least a portion of the band to provide health related information to the user, the monitor control unit comprising:
    a display unit disposed on an entirety of the monitor control unit to display the health related information to the user, such that the display unit is disposed on each side of the monitor control unit, such that the display unit is viewable at a first angle to a first side of the monitor control unit, viewable at a second angle different from the first angle to a second side of the monitor control unit, viewable at a third angle opposite with respect to the second angle to a third side of the monitor control unit, and viewable at a fourth angle opposite with respect to the first angle to a fourth side of the monitor control unit while the band and the monitor control unit are unworn by the user, such that the display unit is only viewable from the first side, the second side, and the third side while the band and the monitor control unit are worn by the user, and a plurality of buttons disposed on a first side and a second side of the display unit, such that the plurality of buttons are touch-screen; and a fastener assembly disposed on at least a portion of the first end of the band and at least a portion of the second end of the band to connect the first end to the second end.

2. The health condition monitoring device of claim 1, wherein the band is waterproof.

3. The health condition monitoring device of claim 1, wherein the monitor control unit comprises:
   a camera disposed on at least a portion of the display unit to record at least one of an image, a photograph, and a video of an environment of the user;
   an audio unit disposed on at least a portion of the display unit; and
   a plurality of sensors disposed within at least a portion of the display unit to detect at least one of a change of position of the plurality of sensors, a luminosity level surrounding the plurality of sensors, and a temperature level of the user.

4. The health condition monitoring device of claim 1, wherein the plurality of buttons comprises:
   a medication reminder button disposed on the first side of the display unit to perform at least one of display a medication reminder on the display unit and emit an audio medication reminder on the audio unit in response to depressing the medication reminder button;
   an appointment reminder button disposed on the first side of the display unit to perform at least one of display an appointment reminder on the display unit and emit an audio appointment reminder on the audio unit in response to depressing the appointment reminder button; and
   a help button disposed on the first side of the display unit to send an emergency signal to an external device of a third party, such that the external device is alerted that the user is experiencing an emergency.

5. The health condition monitoring device of claim 4, wherein the audio medication reminder and the audio appointment reminder are configured to sound like a family member.

6. The health condition monitoring device of claim 1, wherein the plurality of buttons further comprises:

an alert button disposed on the second side of the display unit to perform at least one of illuminating the display unit and emitting an alarm sound from the audio unit in response to depressing the alert button.

7. The health condition monitoring device of claim 3, wherein the monitor control unit further comprises:
   a GPS unit disposed within at least a portion of the display unit to track a location of the user.

8. The health condition monitoring device of claim 3, further comprising:
   an optical character recognition (OCR) unit disposed within at least a portion of the monitor control unit to convert at least one of a letter, a word, and a phrase captured from the camera into the letter, the word, and the phrase, respectively, for a message.

9. A health condition monitoring device, comprising:
   a band that is wearable by a user;
   a monitor control unit disposed on at least a portion of the band to provide health related information to the user, the monitor control unit comprising:
     a display unit disposed on an entirety of the monitor control unit to display the health related information to the user, and display a barcode that stores a medical profile of the user, such that the display unit is disposed on each side of the monitor control unit, such that the display unit is viewable at a first angle to a first side of the monitor control unit, viewable at a second angle different from the first angle to a second side of the monitor control unit, viewable at a third angle opposite with respect to the second angle to a third side of the monitor control unit, and viewable at a fourth angle opposite with respect to the first angle to a fourth side of the monitor control unit while the band and the monitor control unit are unworn by the user, such that the display unit is only viewable from the first side, the second side, and the third side while the band and the monitor control unit are worn by the user, and
     a plurality of buttons disposed on a first side and a second side of the display unit, such that the plurality of buttons are touch-screen; and
   a fastener assembly disposed on at least a portion of a first end of the band and at least a portion of a second end of the band to connect the first end to the second end.

\* \* \* \* \*